(12) United States Patent
Nakamura

(10) Patent No.: US 6,446,134 B1
(45) Date of Patent: *Sep. 3, 2002

(54) NETWORK MANAGEMENT SYSTEM

(75) Inventor: Jun Nakamura, Kanagawa (JP)

(73) Assignee: Fuji Xerox Co., LTD, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/544,368

(22) Filed: Oct. 17, 1995

(30) Foreign Application Priority Data

Apr. 19, 1995 (JP) ............................................ 7-116588

(51) Int. Cl.⁷ .............................................. G06F 15/16
(52) U.S. Cl. ............................ 709/313; 714/4; 709/224
(58) Field of Search ........................... 395/700, 200.11, 395/200, 200.15, 182.02; 340/825.02, 827, 506; 364/491; 370/401; 714/1–57; 709/310–332, 200, 224

(56) References Cited

U.S. PATENT DOCUMENTS

| | | | | |
|---|---|---|---|---|
| 4,709,365 A | * | 11/1987 | Beale et al. ............ 395/182.02 |
| 5,109,486 A | * | 4/1992 | Seymour .................... 395/200 |
| 5,237,677 A | * | 8/1993 | Hirosawa et al. | |
| 5,274,631 A | * | 12/1993 | Bhardwaj ................... 370/401 |
| 5,299,207 A | * | 3/1994 | Fujii | |
| 5,333,183 A | * | 7/1994 | Herbert ...................... 379/112 |
| 5,388,189 A | * | 2/1995 | Kung .......................... 395/50 |
| 5,402,431 A | * | 3/1995 | Saadeh et al. ............. 371/67.1 |
| 5,448,724 A | * | 9/1995 | Hayashi | |
| 5,471,399 A | * | 11/1995 | Tanaka et al. ............. 364/491 |
| 5,513,321 A | * | 4/1996 | Katori ................... 395/200.15 |
| 5,566,337 A | * | 10/1996 | Szymanski et al. ......... 395/733 |
| 5,594,426 A | * | 1/1997 | Ushijima et al. ...... 340/825.02 |
| 5,634,011 A | * | 5/1997 | Auerbach et al. .......... 395/200 |
| 5,636,344 A | * | 6/1997 | Lewis ................... 395/200.11 |
| 5,677,683 A | * | 10/1997 | Kawasaki et al. .......... 340/827 |
| 5,777,549 A | * | 7/1998 | Arrowsmith et al. ....... 340/506 |

FOREIGN PATENT DOCUMENTS

| | | |
|---|---|---|
| DE | 43 21 583 | 5/1994 |
| JP | 3025560 | 4/1991 |
| JP | 7107181 | 4/1995 |

OTHER PUBLICATIONS

European Search Report dated Sep. 25, 1996.

* cited by examiner

Primary Examiner—Alvin Oberley
Assistant Examiner—P. Caldwell
(74) Attorney, Agent, or Firm—Finnegan, Henderson, Farabow, Garrett & Dunner, L.L.P.

(57) ABSTRACT

In a network system wherein a plurality of server units and a plurality of manager units for managing the server units are connected to a network, the manager units are notified of a state detected in each of the server units in the network system for monitoring service of the server unit. Each of the server units comprises a destination storage unit for receiving a fault notification request from one of the manager units and storing the manager unit as a destination, a notification unit, when fault occurs in service, for sending fault information indicating the contents of the fault to the destination, and a control unit for controlling start and stop of service.

8 Claims, 14 Drawing Sheets

FAULT INFORMATION COMMON ENTRIES:
- 31 FAULT OCCURRENCE TIME
- 32 SYSTEM MESSAGE
- 33 FAULT OCCURRENCE UNIT NAME
- 34 FAULT INFORMATION LENGTH
- 35 FAULT INFORMATION DIFFERENT FOR EVERY SERVER UNIT

| NUMBER FIELD 41 | PROTOCOL FIELD 42 | DESTINATION ADDRESS FIELD 43 | PORT FIELD 44 | BUSY FLAG FIELD 45 |
|---|---|---|---|---|
| 1 | TCP | 129. 249. 38. 11 | 2245 | BUSY |
| 2 | TCP | 129. 249. 38. 19 | 3391 | BUSY |
| 3 | TCP | 129. 249. 38. 111 | 4088 | IDLE |
|  |  |  |  |  |
| ⋮ | ⋮ | ⋮ | ⋮ | ⋮ |
| N | TCP | 129. 249. 22. 11 | 2245 | BUSY |

FIG. 13

| NUMBER FIELD 51 | PROTOCOL FIELD 52 | DESTINATION ADDRESS FIELD 53 | PORT FIELD 54 | BUSY FLAG FIELD 55 | FILTER CONDITION FIELD 56 |
|---|---|---|---|---|---|
| 1 | TCP | 129. 249. 38. 11 | 2245 | BUSY | FILTER 1 |
| 2 | TCP | 129. 249. 38. 19 | 3391 | BUSY | FILTER 2 |
| 3 | TCP | 129. 249. 38. 111 | 4088 | IDLE | FILTER 3 |
| .... | .... | .... | .... | .... | .... |
| N | TCP | 129. 249. 22. 11 | 2245 | BUSY | FILTER N |

50

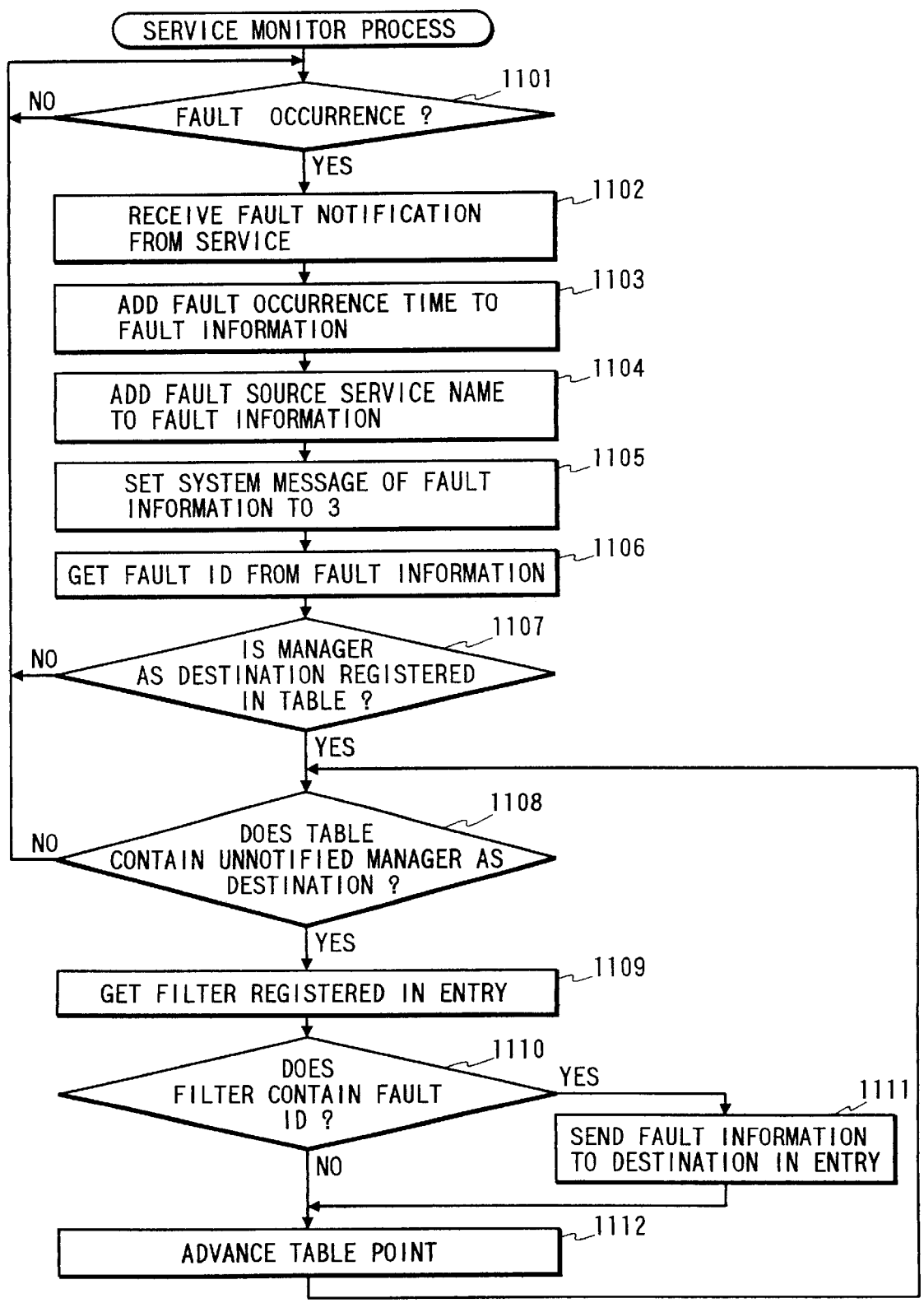

NETWORK MANAGEMENT SYSTEM

BACKGROUND OF THE INVENTION

The present invention relates to a network management system which can monitor faults such as hang-up and service stop of service units in a network to control program start and stop, and more particularly to a network management system which can notify a manager unit of the condition of a fault occurring in a service unit in a network system to control starting and stopping of the service unit by instructions of the manager unit.

Hitherto, for example, prior art such as "network system" described in Japanese Patent Unexamined Publication No.Hei 6-62006 and "network resource monitoring system" described in Japanese Patent Unexamined Publication No.Hei 6-266635 have been known as network management technique.

By the way, in the fault monitoring technique in network management of the "network resource monitoring system" described in Japanese Patent Unexamined Publication No.Hei 6-266635, fault information of which manager units (monitor units) are informed is not recorded in a server unit. For example, a manager unit started after the server unit fault occurs, differs from other manager units in displayed information or cannot keep track of fault source or progress. Thus, the manager unit needs polling the server units, increasing network traffic.

A unit for issuing a fault information notification needs to be preset; such a configuration has disadvantages in that while another manager unit is monitoring server unit or executing a predetermined service, the fault information destination cannot be changed.

In the "network system" described in Japanese Patent Unexamined Publication No.Hei 6-62006, if a plurality of manager units (monitor units) exist on a network, when a server unit goes down, each manager unit needs polling to know that the server unit is restarted. Thus, as the manager units increase, network traffic increases and a load in the system increases. In a system unit of a workstation where the manager unit operates, polling is always performed so that execution of other programs is hindered.

SUMMARY OF THE INVENTION

It is therefore a first object of the invention to provide a network management system which can manage information from service units and notify manager units, which made a notification request, of information to easily monitor server units from the manager units, so that the information difference among manager units is eliminated. It is a second object of the invention to provide a network management system which can notify a manager unit of the state of fault occurring in a service unit in a network system and control starting and stopping the service unit by instructions of the manager unit.

To these ends, according to a first aspect of the invention, there is provided, in a network system wherein a plurality of server units and a plurality of manager units for managing the server units are connected to a network, a network management system which notifies the manager units of a state detected in each of the server units in the network system for monitoring service of the server unit, characterized in that each of the server units comprises destination storage means for receiving a fault notification request from one of the manager units and storing the manager unit as a destination, notification means, when fault occurs in the service unit, for sending fault information indicating contents of the fault to the destination, and means for controlling start and stop of the service unit.

According to a second aspect of the invention, there is provided, in a network system wherein a plurality of server units and a plurality of manager units for managing the server units are connected to a network, a network management system which notifies the manager units of a state detected in each of the server units in the network system for monitoring service of the server unit, characterized in that each of the server units comprises destination storage means for receiving a notification request from one of the manager units and storing the manager unit as a destination, means for detecting program stop of a service unit, notification means, when the detection means detects the program stop of the service unit, for sending information indicating contents of the event to the destination, and means for controlling start and stop of the service unit. According to a third aspect of the invention, there is provided, in a network system wherein a plurality of server units and a plurality of manager units for managing the server units are connected to a network, a network management system which notifies the manager units of a state detected in each of the server units in the network system for monitoring service of the server unit, characterized in that each of the server units comprises destination storage means for receiving a fault notification request from one of the manager units and storing a destination of the manager unit to which a filter condition is given, filtering means for selecting fault information contents in accordance with the filter condition, notification means, when fault occurs in service, for sending fault information indicating contents selected by the filtering means to the destination, and means for controlling start and stop of service by instructions of the manager unit.

In the first aspect of the invention, in the network system wherein a plurality of server units and a plurality of manager units for managing the server units are connected to the network, the network management system notifies the manager units of the state detected in each of the server units in the network system for monitoring service of the server unit. Each of the server units comprises destination storage means, notification means, and control means. When the notification storage means receives a fault notification request from one of the manager units and stores the manager unit as a destination, if fault occurs in the service unit, the notification means sends fault information indicating the fault contents to the destination. The control means controls starting and stopping the service unit, for example, by instructions from the manager unit receiving the information.

Thus, if each manager unit previously issues a fault notification request to the service units, when fault occurs in one of the service units, the manager unit can receive a fault notification from the service unit and need not execute polling for monitoring the service units, avoiding waste of computer and communication resources. When receiving the fault notification, the manager unit can instruct the control means to stop other unnecessary service units and start other necessary service units in response to the fault notification contents.

In the second aspect of the invention, in the network system wherein a plurality of server units and a plurality of manager units for managing the server units are connected to the network, the network management system notifies the manager units of the state detected in each of the server units in the network system for monitoring service of the server unit. In this case, in the server unit, the destination storage means receives a notification request from one of the manager units and stores the manager unit as a destination. The detection means detects the service unit program stopping. When the service unit program stopping is detected, the notification means sends information indicating the contents of the event to the destination. The control means controls starting and stopping the service unit.

Thus, if each manager unit previously issues a notification request to the service units, when one of the service units stops providing service, the manager unit can receive a service stop notification from the service unit and need not execute polling for monitoring the service units, avoiding waste of computer and communication resources. When the service unit stopping is detected, a notification to the effect is sent. Thus, in the server unit, if the service program in the service unit detects abnormal end, it can also be restarted by the control means without notification.

In the third aspect of the invention, in the network system wherein a plurality of server units and a plurality of manager units for managing the server units are connected to the network, the network management system notifies the manager units of the state detected in each of the server units in the network system for monitoring service of the server unit. The destination storage means in the server unit receives a fault notification request from one of the manager units and stores the destination of the manager unit to which a filter condition is given. The filtering means selects the fault information contents in accordance with the filter condition. When fault occurs in service, the notification means sends fault information indicating the contents selected by the filtering means to the destination. The control means controls start and stop of service by instructions of the manager unit.

Thus, the network management system of the invention enables each manager unit to uniformly manage service information from the service units and can eliminate the information difference among the manager units. If the service program in the service unit goes down, automatically it is restarted and a fault notification is only issued. The manager units need not execute polling for detecting service starting. Further, when it is restarted, automatic reconnection is also made in accordance with a notification request instruction from the manager units, so that the contents to be managed by the manager units do not become complicated.

BRIEF DESCRIPTION OF THE DRAWINGS

FIG. 13 is an illustration showing an example of a destination registration table in which destinations containing a filter condition are registered in a destination registration processing section;

FIG. 15 is a flowchart explaining a fault notification process flow containing filtering.

DETAILED DESCRIPTION OF THE INVENTION

Figure 1:
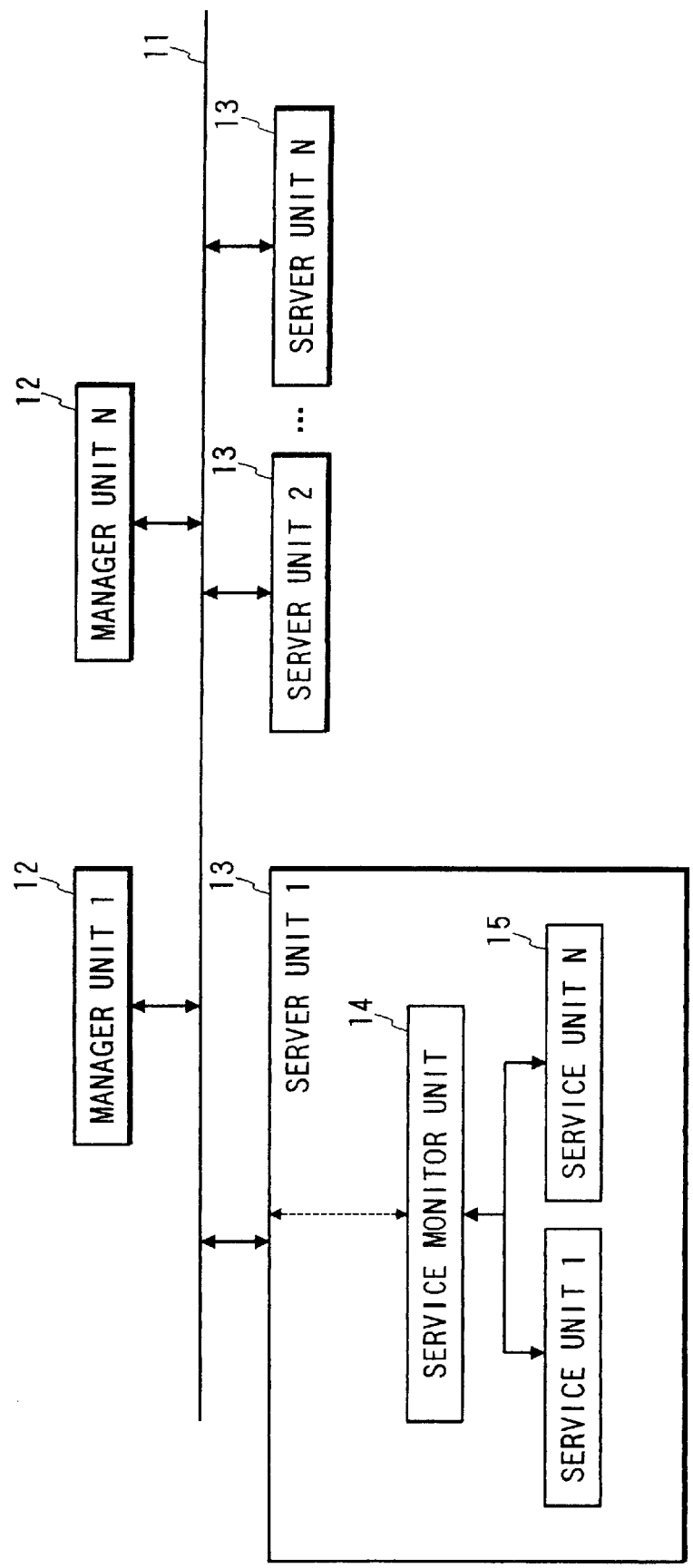
FIG. 1 is a block diagram showing the configuration of a network management system according to a first embodiment of the invention.

Referring now to the accompanying drawings, preferred embodiments of the invention will be described.
First Embodiment:

FIG. 1 is a block diagram showing the configuration of a network management system according to a first embodiment of the invention. In FIG. 1, numeral 11 is a communication channel of a network such as a LAN (local area network), numeral 12 is a manager unit, numeral 13 is a server unit, numeral 14 is a service monitor unit, and numeral 15 is a service unit. A plurality of server units 13 and a plurality of manager units 12 for monitoring the server units are connected to the network communication channel 11 for making up a network system. Each server unit 13 comprises service units 15 for normal service and a service monitor unit 14 for monitoring the state of each service unit.

The service monitor unit 14 comprises system components as described with reference to FIG. 2. A fault detected in a service unit 15 on the network system is notified to the manager unit 12 for managing the server unit 13. In the normal system operation state, a client unit (not shown) issues a processing request directly to the server unit 13 in response to a request of processing contents.

Figure 2:
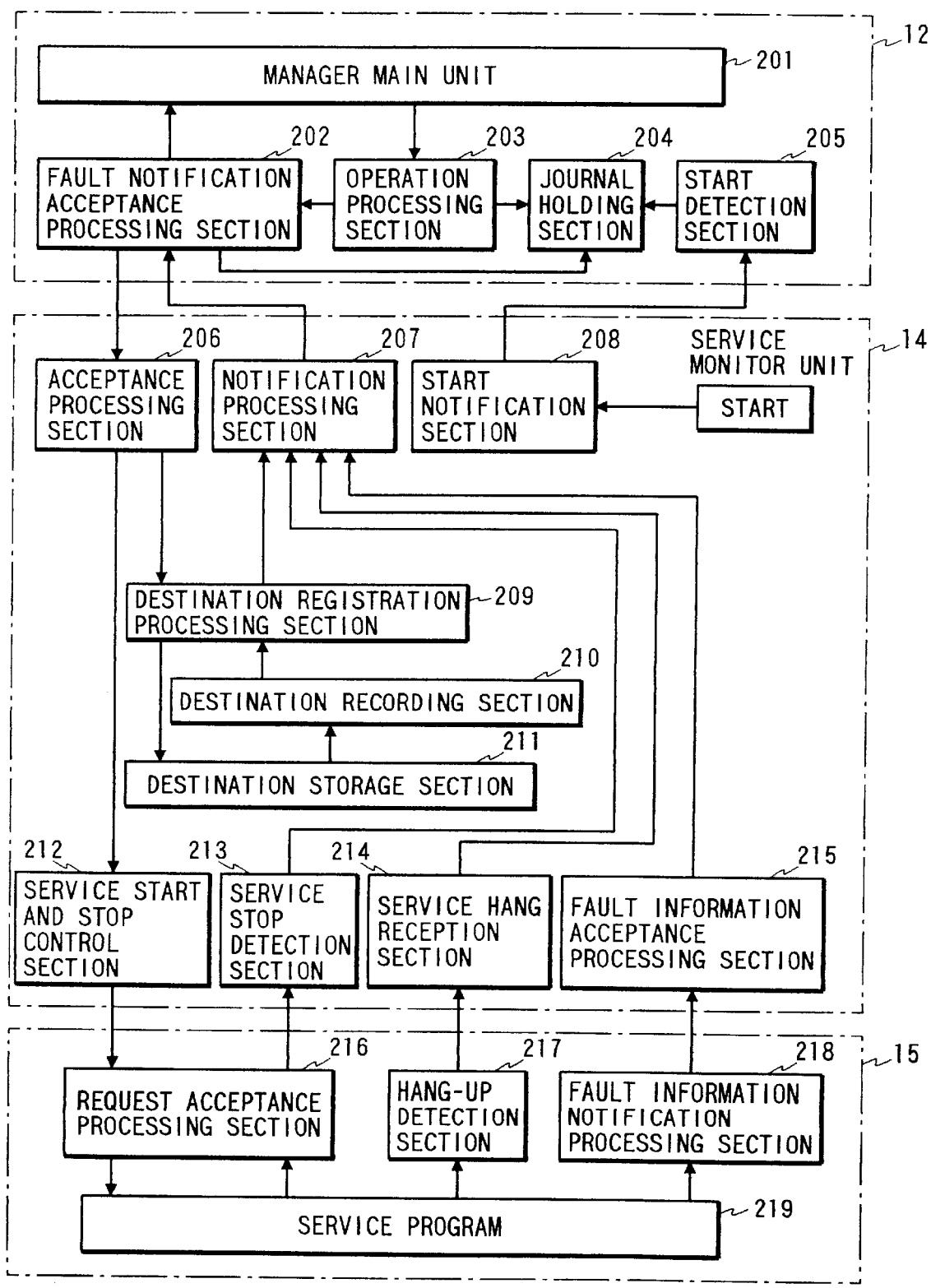
FIG. 2 is a block diagram centering on the configuration of the main part of a service monitor unit according to the first embodiment.

FIG. 2 is a block diagram centering on the configuration of the main part of the service monitor unit according to the embodiment. It also shows related processing blocks centering on the configuration of the service monitor unit and is also a view showing data flow.

In FIG. 2, numeral 12 is the manager unit, numeral 14 is the service monitor unit, numeral 15 is the service unit, numeral 201 is a manager main unit, numeral 202 is a fault notification acceptance processing section, numeral 203 is an operation processing section, numeral 204 is a journal holding section, numeral 205 is a start detection section, numeral 206 is an acceptance processing section, numeral 207 is a notification processing section, numeral 208 is a start notification section, numeral 209 is a destination registration processing section, numeral 210 is a destination recording section, numeral 211 is a destination storage section, numeral 212 is a service start and stop control section, numeral 213 is a service stop detection section, numeral 214 is a service hang reception section, numeral 215 is a fault information acceptance processing section, numeral 216 is a request acceptance processing section, numeral 217 is a hang-up detection section, numeral 218 is a fault information notification processing section, and numeral 219 is a service program.

The service program 219 is started to provide a predetermined service in response to a request from each client unit connected to the network. When it is started, the request from the client unit is accepted by the request acceptance processing section 216 via the service monitor unit 14 and the predetermined service is provided. The service program 219 is started and stopped by instructions of the service monitor unit 14 as described blow; it is also terminated by instructions of the service monitor unit 14.

The service monitor unit 14 monitors the state of the service unit 15 and, for example, notifies the manager unit making a fault notification request of fault information, stop information, etc., received from the service program 219.

The acceptance processing section 206 of the service monitor unit 14 accepts a fault notification request from the manager unit 12 and the destination registration processing section 209 stores the address of the manager unit as the destination in the destination storage section 211. This means that the network address of the manager unit as the destination is recorded in a table in a memory and further recorded in a nonvolatile storage such as a file, whereby if, for example, the server unit goes down, the service monitor unit 14 reconstructs the table of the manager unit connected to the server unit from the contents stored in the destination storage section 211 and restarts the service program 219 which was placed in the start state. After starting the service program, the service monitor unit 14 executes broadcast processing for notifying the manager units that it has started the service program.

The manager unit 12 contains a stub for remotely operating the service monitor unit 14 (for providing a remote procedure call). The stub in the manager unit 12 is made up of the operation processing section 203 for issuing a connection request, a fault information notification request, etc., to the service monitor unit 14, a fault notification acceptance processing section 202 for receiving fault information from the service monitor unit 14, the journal holding section 204 for recording connection to and disconnection from the service monitor unit 14, and the start detection section 205 for detecting the start state of the program in the service unit.

The service unit 15 contains a stub for remote operation from the service monitor unit 14 (for providing a remote procedure call) in addition to the service program 219 for providing intrinsic service. The stub, which is provided from the service monitor unit 14, is made up of the fault information notification section 218 for notifying the service monitor unit 14 of fault information, the request acceptance processing section 216 for accepting service program start and stop requests, and the hang-up detection section 217 for detecting a hang state of the service program 219, as shown in FIG. 2.

In the system configuration, the stubs (202–205 and 216–218) contained in the manager unit 12 and the service unit 15 are realized as a library with the service monitor unit 14 as a process in the server unit. Communication between the service monitor unit 14 and the respective stubs is executed using a library having an interface existing on the upper layer of a transport layer and provided by abstracting the transport layer.

When receiving a notification request from the manager unit 12, the acceptance processing section 206 of the service monitor unit 14 stores the destination address added to the request in a table in the memory in the destination registration processing section 209. The contents of the table are recorded in a file in the destination storage 211. When receiving fault information from the service unit 15 via the service stop detection section 213, the service hang acceptance section 214, the fault information acceptance processing section 215, etc., the notification processing section 207 of the service monitor unit 14 looks up in the table in the destination registration processing section 209 or the table created by the destination recording section 210 from the file in the destination storage section 211 and sends the fault information to the manager unit as the destination recorded in the table.

When the manager unit 12 makes a disconnection request or terminates (stops), the manager unit data as the destination in the table is deleted from the table and file. Since communication between the manager unit 12 and the service monitor unit 14 is connected using a connection-oriented protocol, termination of the manager unit can be detected without any special detection mechanism.

Figures 3, 4:
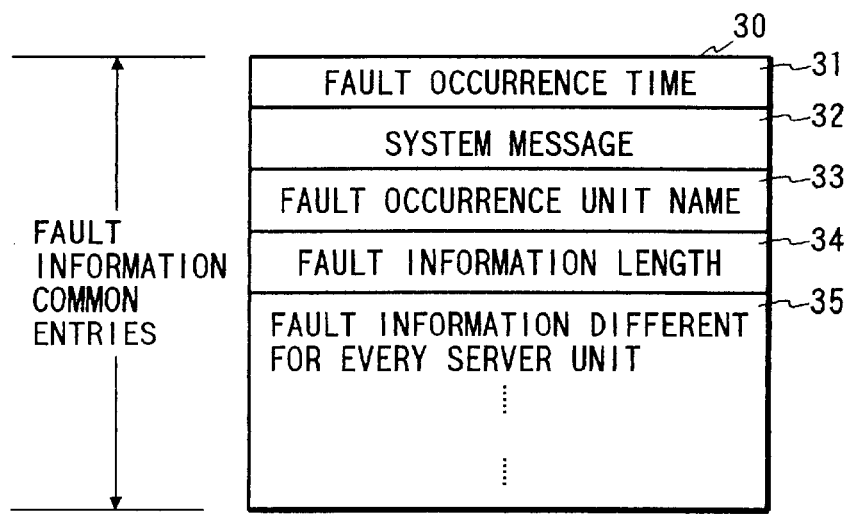
FIG. 3 is an illustration explaining the data structure of fault information.
FIG. 4 is an illustration showing an example of a destination registration table in a destination registration processing section.

FIG. 3 is an illustration explaining the data structure of fault information. In the network management system, fault information is provided in the data format, for example, as shown in FIG. 3. As shown here, fault information 30 is constructed of data in fields which consists of fault occurrence time 31, system message 32, fault occurrence unit name 33, fault information length 34, and actual information 35 of fault information varying from one server unit to another.

Referring again to FIG. 2, the service stop detection section 213 of the service monitor unit 14 detects service stop, for example, according to a wait system call in a UNIX system or API of "Wait For Multiple Object" in a Windows NT system. In this case, the service stop detection section 213 sets the system message field 32 of the fault information to 2 and notifies the manager unit as the destination registered in the table.

If the service stops in response to a termination request from the service monitor unit, the system message field is set to 1 and the fault information is sent. If the stub contained in the service program detects the service program hanging up, it notifies the service monitor unit of the event, in which case the service monitor unit sends it as a message with the system message field set to 0. Normal fault notification from the service program is sent as a message with the system message field set to 3.

The start notification section 208 of the service monitor unit 14 broadcasts at the starting (restarting) time indicating that it starts. It also makes reconnection to the previously connected manager unit 12 from the file recording the table. The hang-up detection section 217 detects the service program 219 hanging up; upon detection of hang-up, it notifies the service hang acceptance section 214 of the service monitor unit 14 of the event.

Next, the operation of the system components of the stub contained in the manager unit 12 will be outlined. The operation processing section 203 receives a fault notification request from the manager main unit 201 and processes it by sending the fault notification request to the service monitor unit 14. To cancel the fault notification request, the operation processing section 203 also processes it. The events are recorded in the journal holding section 204. The journal record is used when the start detection section 205 detects the service monitor unit 14 starting. That is, (1) When the fault notification request is canceled, if the target service monitor unit is down, the request will be canceled when the target service monitor unit starts.

(2) When the fault notification request is made, if the target service monitor unit is down, the request will be made when the target service monitor unit starts.

The manager unit 12 can specify fault information that it desires to be sent from the service unit 15 for making a fault notification request. In this case, the service monitor unit 14 manages the request contents for each manager unit like destinations, as described below. The service monitor unit 14 compares occurring fault information with its filter condition and if the fault information matches the filter condition, notifies the manager unit 12. The service monitor unit 14 may record the occurring fault information in a log file. When the service program abnormally ends, the service monitor unit 14 is adapted to restart the service program.

By the way, in the network management system, if the manager unit previously sends a notification request to the service monitor unit of the server unit which starts a predetermined service program and provides service, when fault occurs in the service, a notification to this effect is returned to the manager unit making the notification request, as described above. For this purpose, the service monitor unit 14 comprises the destination registration processing section 209 in which the manager unit making the notification request is registered as a destination. FIG. 4 is an illustration showing an example of a destination registration table in the destination registration processing section. As shown here, the destination registration table 40 consists of a number field 41, a protocol field 42, a destination address field 43, a port field 44, and a busy flag field 45. To register one manager unit as a destination, data of the respective fields are registered as entry data.

The value of the number used as an index is stored in the number field 41. When a notification request is accepted, the number value is returned to the manager unit. To cancel the notification request, the manager unit specifies the number as an index. The protocol used to notify the manager unit of fault information is specified in the protocol field 42. The network address of the host system in which the manager unit operates is set in the destination address field 43. The port number used for the manager unit to receive a fault notification at the computer specified with the connection destination address is specified in the port field 44. A busy or idle flag is set in the busy flag field 45. If the busy flag is set, it indicates that the corresponding entry is the current notification target; if the idle flag is set, it indicates that the corresponding entry is not the notification target.

Figure 5:
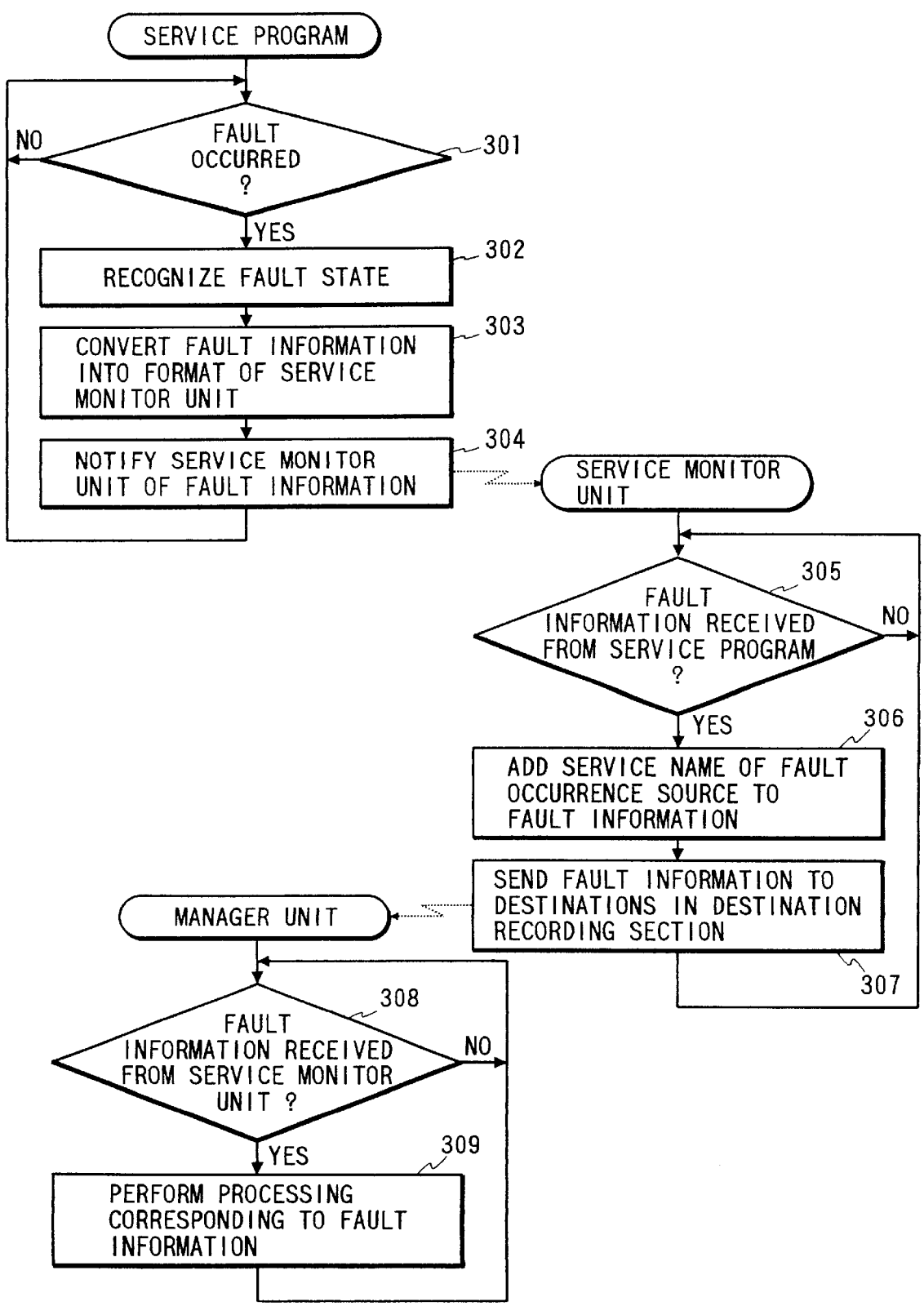
FIG. 5 is a flowchart explaining an information flow for passing fault information detected by a service program to the manager unit.
Figure 6:
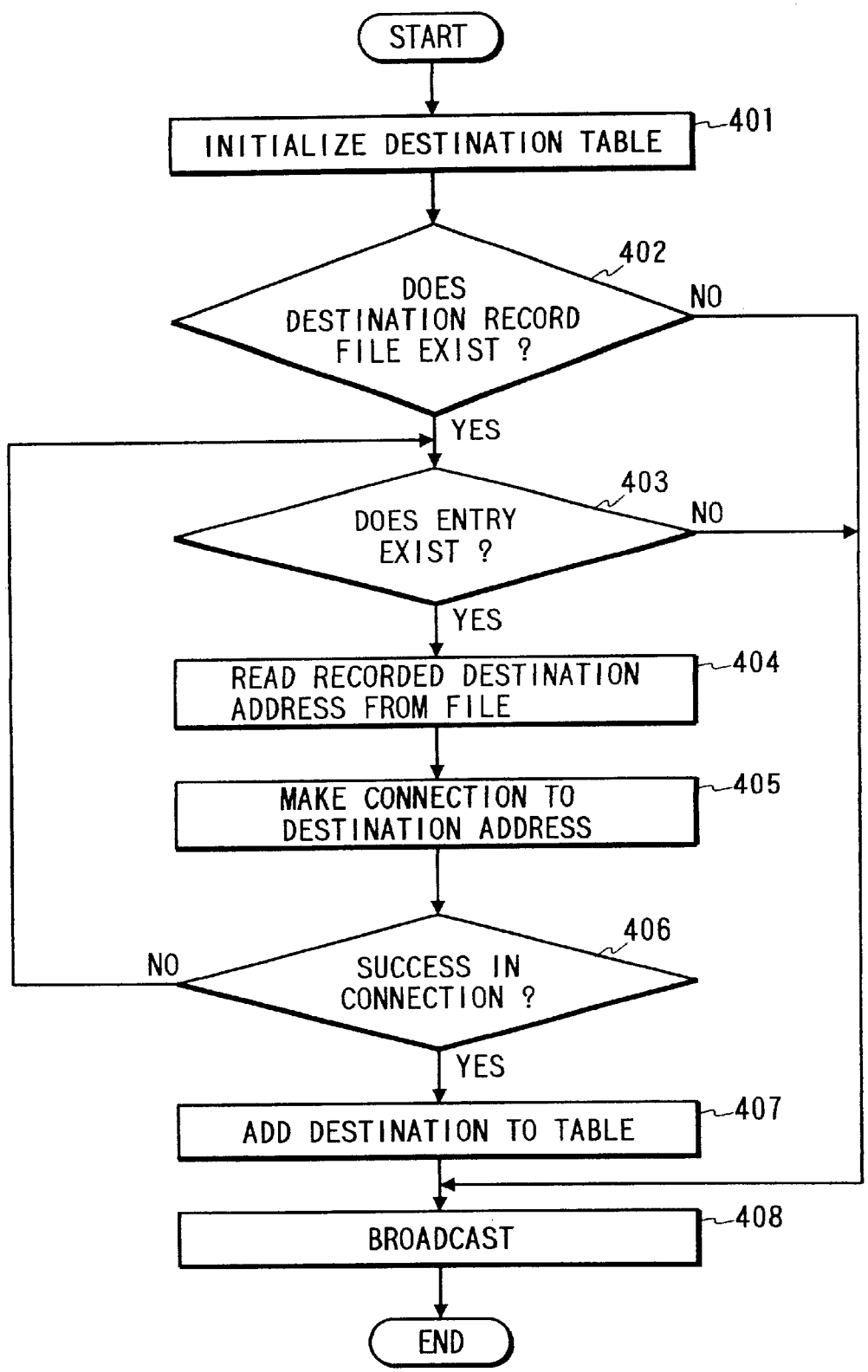
FIG. 6 is a flowchart explaining a connection process flow at restarting for recovery when fault occurs.

Next, characteristic processes in the network management system of the embodiment thus configured will be discussed with reference to flowcharts. FIG. 5 is a flowchart explaining an information flow for passing fault information detected by the service program to the manager unit. FIG. 6 is a flowchart explaining a connection process flow at restarting for recovery when fault occurs.

Figure 7:
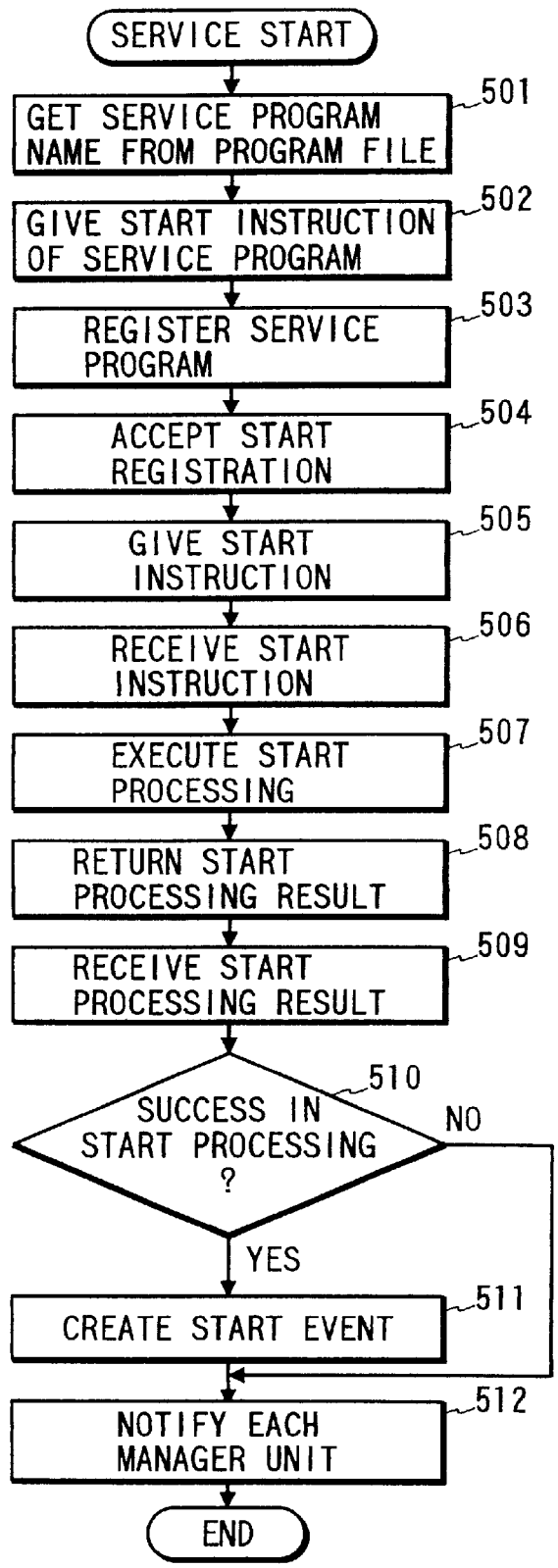
FIG. 7 is a flowchart explaining a start notification process flow when a service program is started.
Figure 8:
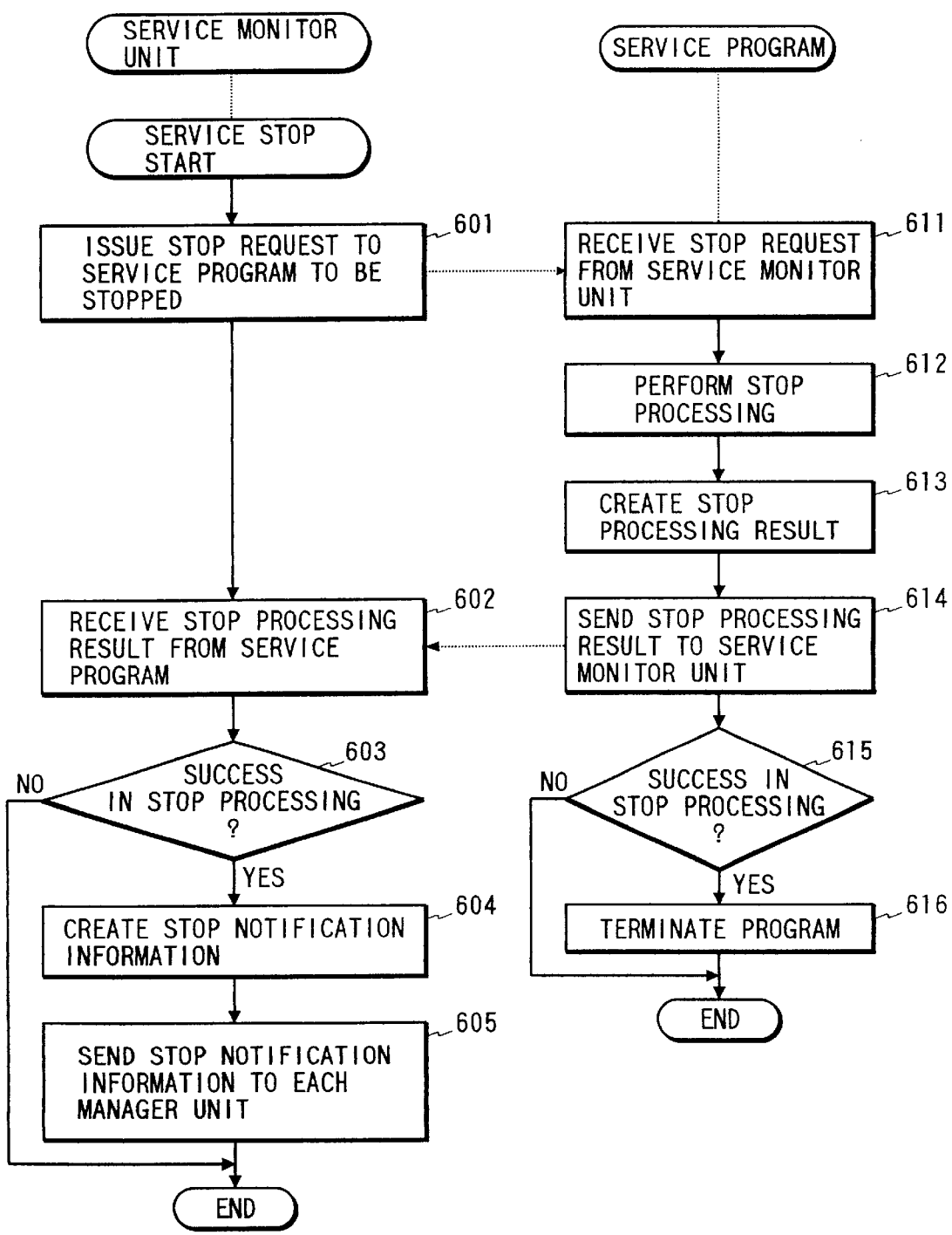
FIG. 8 is a flowchart explaining a stop notification process flow when the service program is stopped.
Figure 9:
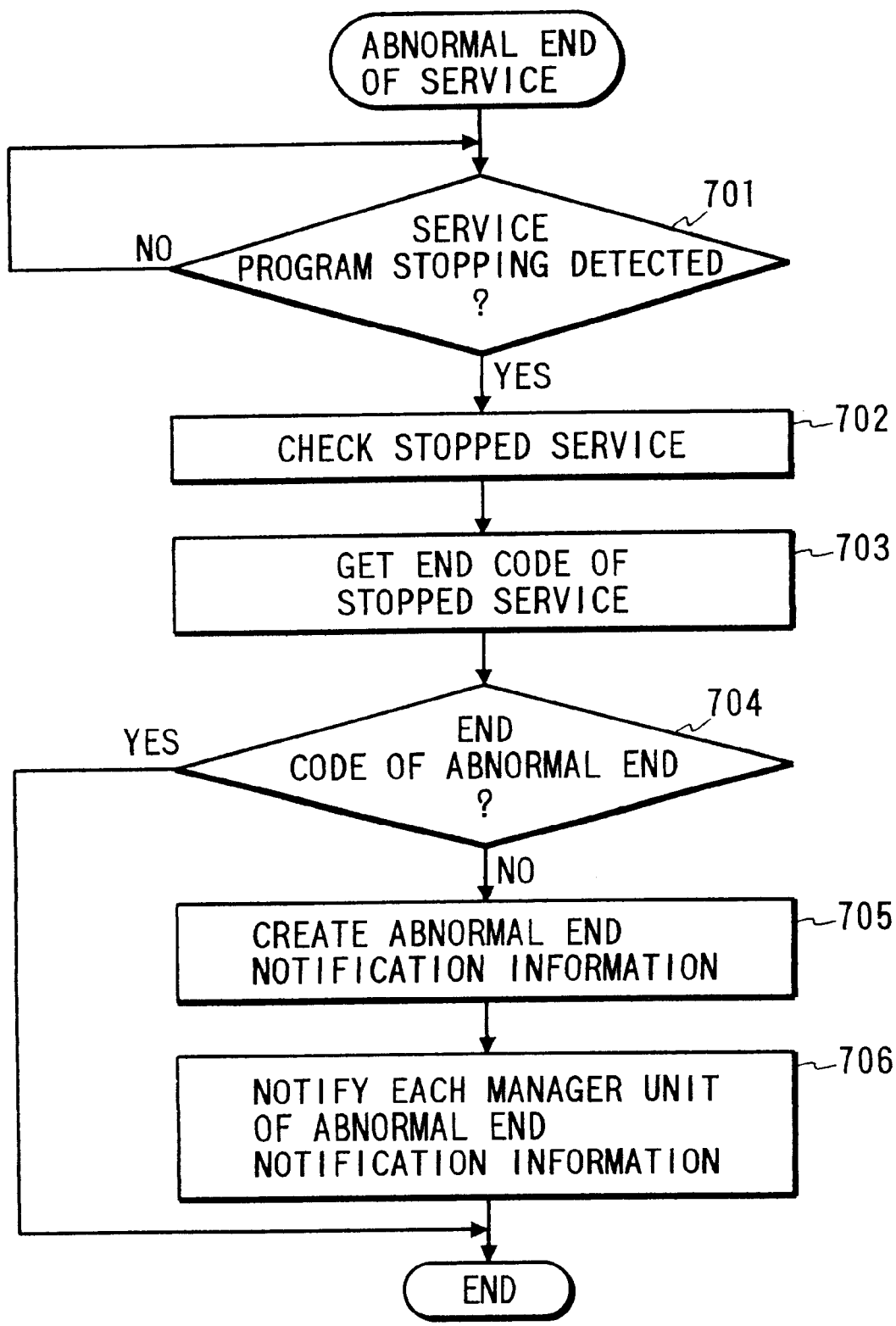
FIG. 9 is a flowchart explaining a termination notification process flow when the service program abnormally ends.

FIG. 7 is a flowchart explaining a start notification process flow when the service program is started. FIG. 8 is a flowchart explaining a stop notification process flow when the service program is stopped. FIG. 9 is a flowchart explaining a termination notification process flow when the service program abnormally ends.

First, an information flow for passing fault information detected by the service program to the manager unit will be discussed with reference to FIG. 5. When the service program detects that fault occurring at step 301, it recognizes the fault state in the service at step 302. Next, the service program converts information on the recognized fault state into the data format of the service monitor unit at step 303, and notifies the service monitor unit of the fault information at step 304. When the service monitor unit receives the fault information from the service program and can ensure that all the fault information has been received at step 305, it adds the service name and server unit name of the fault occurrence source to the fault information at step 306, and sends the fault information to the manager units as the destinations with their notification requests registered in the destination registration section at step 307. Thus, the manager unit receives the fault information from the service program at step 308 and performs processing corresponding to the fault information at step 309.

Next, a connection process flow at restarting for recovery when fault occurs will be discussed with reference to FIG. 6. In the process, connection is recovered according to the data contents in the destination registration table in the destination registration processing section of the service monitor unit registered in the file in the destination storage section 211. That is, the service program providing service is started and the connection is executed, then other manager units are notified of the connection recovery.

When the process is started, first the destination registration table in the destination registration processing section is initialized at step 401, next whether or not the destination record file exists, is determined at step 402 and further whether or not the destination entry is recorded in the destination record fill, is determined at step 403. If the destination entry is recorded, the recorded destination address is read from the destination record file at step 404 and connection processing to the destination address is performed at step 405. For example, a check is made to see a response from the manager unit as the destination for determining whether or not the connection results in success at step 406. If the connection results in success, the destination is added to the destination registration table at step 407.

If success in the connection cannot be confirmed, steps 403–406 are repeated for continuing the connection process. If the connection results in success, the destination is added to the destination registration table. Broadcasting is performed for notifying other manager units at step 408, and the process is terminated.

Next, a start notification process flow when the service program is started will be discussed with reference to FIG. 7. In the process, the service program name is gotten from a program file at step 501 and a start instruction of the service program is given at step 502. Next, the service program is registered in the service start and stop control section at step 503. The service start and stop control section accepts the registration and performs start processing of the service program at step 504.

The service start and stop control section gives a start instruction to the service program at step 505. Then, the service program receives the start instruction at step 506, executes start processing at step 507, and returns the start processing result at step 508. Then, the service start and stop control section receives the start processing result at step 509 and determines whether or not the start processing results in success at step 510. If it can be confirmed that the start processing results in success, then a start event is created at step 511, each manager unit is notified of the created event at step 512, and the process is terminated.

Next, a stop notification process flow when the service program is stopped will be discussed with reference to FIG. 8. To stop the service program in the service unit, when the service monitor unit makes a stop request for the service to be stopped at step 601, the service program receives the stop request at step 611 and performs stop processing at step 612. It creates the stop processing result at step 613 and sends the stop processing result to the service monitor unit at step 614.

On the other hand, when the service monitor unit receives the stop processing result from the service program at step 602, then it determines whether or not the stop processing results in success at step 603. If the service monitor unit can determine that the stop processing results in success, it creates stop notification information to the manager units at step 604 and sends the created stop notification information to the manager units at step 605.

After sending the stop processing result to the service monitor unit at step 614, the service program also checks that the stop processing results in success at step 615, and terminates the service program.

Next, a termination notification process flow when the service program abnormally ends will be discussed with reference to FIG. 9. In the process, as shown in FIG. 9, when service program stopping is detected at step 701, the stopped service is checked at step 702. To make a system message of fault information, the end code of the stopped service is gotten at step 703. Next, if the end code can be determined to be the end code of normal end at step 704, the process is terminated as it is. If the end code cannot be determined to be the end code of normal end at step 704, then abnormal end notification information is created at step 705, the manager units are notified of the abnormal end notification information at step 706, and the process is terminated.

Figure 10:
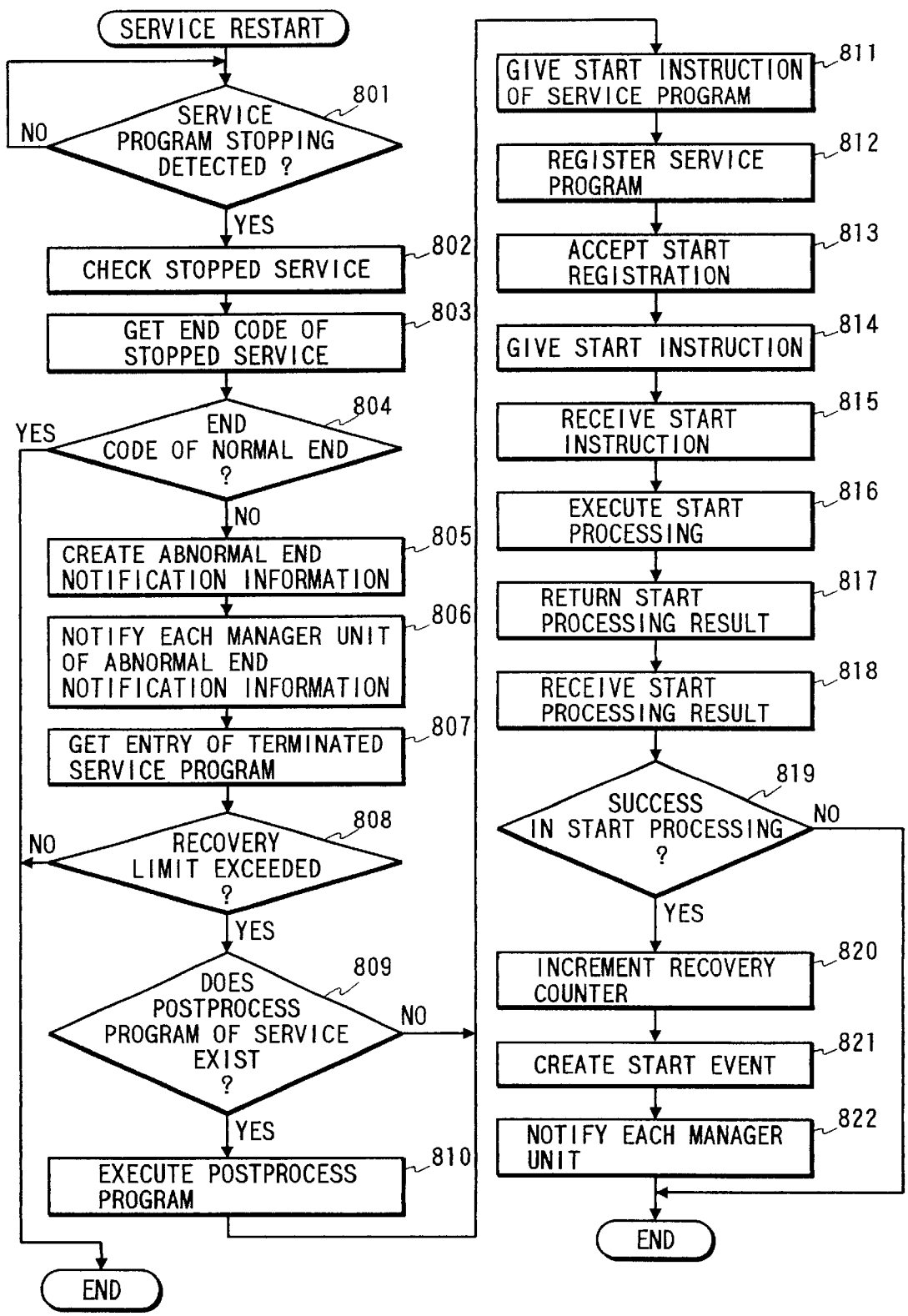
FIG. 10 is a flowchart explaining a service restart process flow in a service unit.

FIG. 10 is a flowchart explaining a service restart process flow in the service unit. When service program stopping is detected in the service unit, the service is restarted. This process flow will be discussed with reference to FIG. 10. The first half of the process is similar to the termination notification process described above.

In the process flow, when the service monitor unit detects service program stopping at step 801, it checks the stopped service at step 802. The end code of the stopped service is gotten at step 803. Next, whether or not the end code is the end code of normal end is determined at step 804. If the end code cannot be determined to be the end code of normal end, then abnormal end notification information is created at step 805 and the manager units are notified of the abnormal end notification information at step 806. The entry of the terminated service program is gotten at step 807. Next, for example, whether or not the restart frequency exceeds a given level is determined. This means that whether or not the recovery limit is exceeded is determined at step 808.

If the recovery limit is not exceeded, restart is enabled. Then, whether or not a postprocess program of the stopped service program (service program to be restarted) exists is determined at step 809. If the postprocess program exists, it is executed at step 810. A start instruction of the service program to be restarted is given at step 811. Next, the service program is registered at step 812. The service start and stop control section accepts the registration and performs start processing of the service program at step 813.

The service start and stop control section gives a start instruction to the service program at step. 814. Then, the service program receives the start instruction at step 815, executes start processing at step 816, and returns the start processing result at step 817. Then, the service start and stop control section receives the start processing result at step 818 and determines whether or not the start processing results in success at step 819. If it can be confirmed that the start processing results in success, then a recovery counter is incremented at step 820, a start event is created at step 821, each manager unit is notified of the created event at step 822, and the process is terminated.

Figure 11:
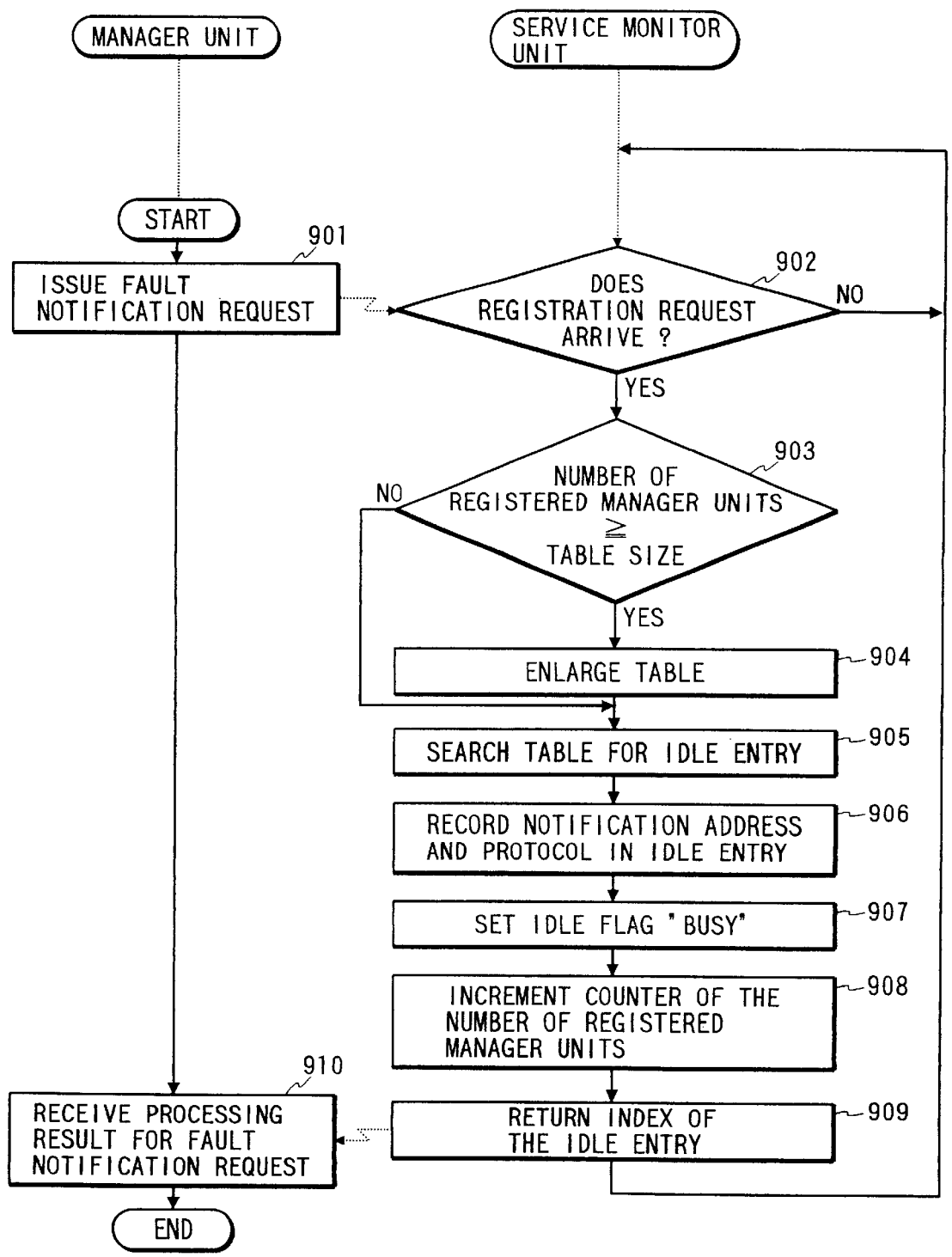
FIG. 11 is a flowchart explaining a destination registration process flow.

Next, a destination registration process flow will be discussed with reference to FIG. 11. In this process, the service monitor unit accepts a fault notification request from the manager unit making the request and registers the manager unit in one entry of the destination registration table as the destination. When the manager unit issues a fault notification request through the manager main unit at step 901, the service monitor unit receives the fault notification request at step 902 and checks for the current number of registered manager units (contents of a registered number counter) and table size at step 903. If the table size is small, the service monitor unit enlarges the table at step 904.

After checking that the table contains any entry in which the manager unit can be registered, the service monitor unit searches the table for an idle entry at step 905 and records the destination address and protocol in the idle entry with the manager unit making the fault notification request as the destination at step 906. It sets the idle flag to "busy" in the busy flag field at step 907. Next, the service monitor unit increments the registered number counter at step 908 and returns the index of the idle entry (number value in the number field) thus found at step 909. The manager unit receives the processing result for the fault notification request at step 910 and terminates the process.

Second Embodiment:

By the way, as described above in the first embodiment, if the manager unit previously issues a fault notification request to each service monitor unit, when fault occurs in the service of the service program monitored by the service monitor unit, the manager unit is notified of appropriate fault information, so that it can take proper steps according to the received fault information contents. In this case, however, unnecessary fault information for specific manager units is also provided. Thus, it is preferable that notified information can be selected so that only necessary information can be obtained, whereby unnecessary data communication is eliminated in the network, and network traffic is decreased to be able to efficiently operate network. Such a network management system will be discussed as a second embodiment of the invention.

Figure 12:
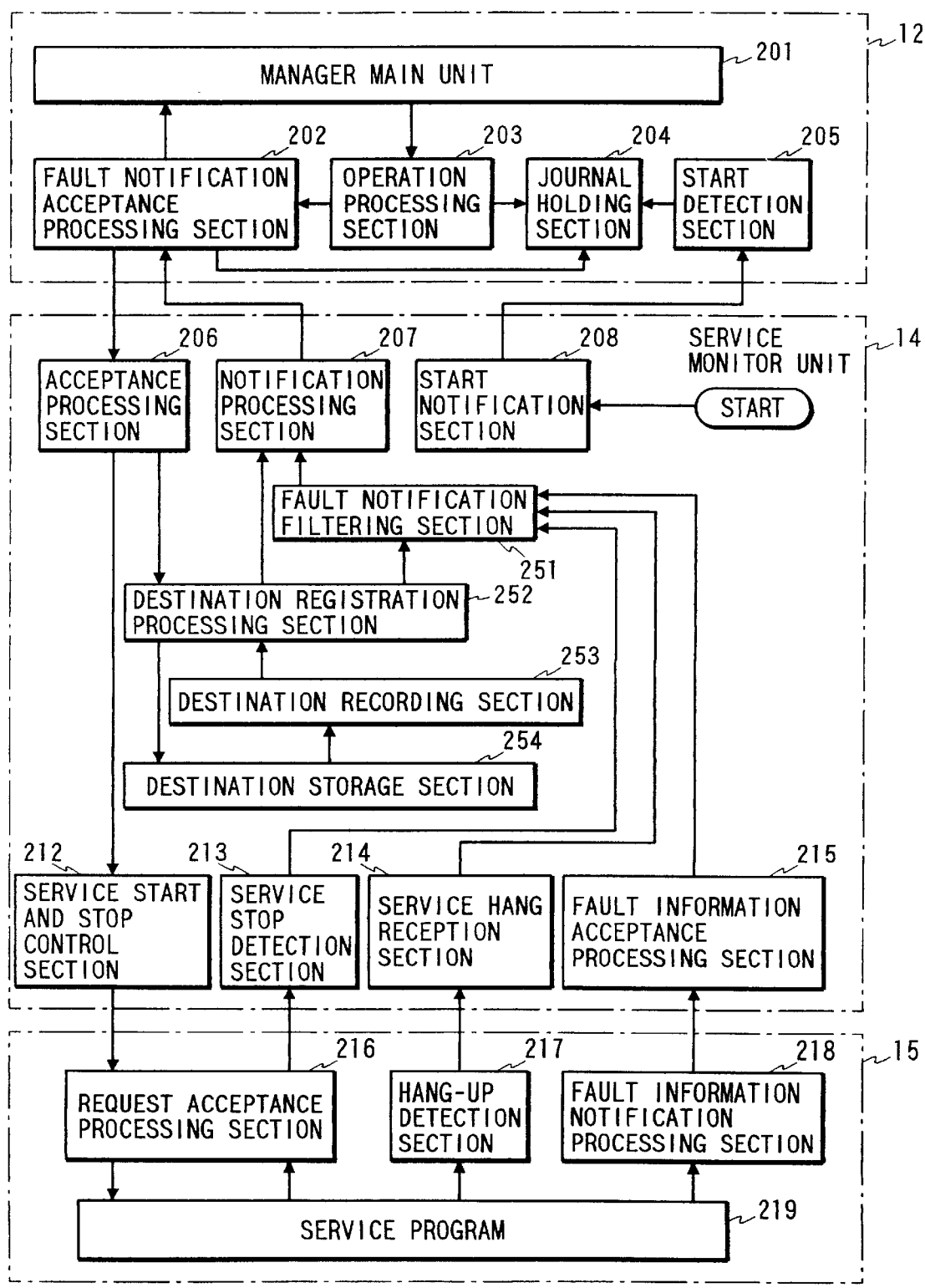
FIG. 12 is a block diagram centering on the configuration of the main part of a service monitor unit according to a second embodiment.

FIG. 12 is a block diagram centering on the configuration of the main part of a service monitor unit according to the second embodiment of the invention. System components identical with those previously described in the first embodiment with reference to FIG. 2 are denoted by the same reference numerals in FIG. 12 and will not be discussed again. Like FIG. 2, FIG. 12 shows related processing blocks centering on the configuration of the service monitor unit and is also a view showing a data flow.

In FIG. 12, numeral 12 is a manager unit, numeral 14 is a service monitor unit, numeral 15 is a service unit, numeral 201 is a manager main unit, numeral 202 is a fault notification acceptance processing section, numeral 203 is an operation processing section, numeral 204 is a journal holding section, numeral 205 is a start detection section, numeral 206 is an acceptance processing section, numeral 207 is a notification processing section, numeral 208 is a start notification section, numeral 212 is a service start and stop control section, numeral 213 is a service stop detection section, numeral 214 is a service hang reception section, numeral 215 is a fault information acceptance processing section, numeral 216 is a request acceptance processing section, numeral 217 is a hang-up detection section, numeral 218 is a fault information notification processing section, and numeral 219 is a service program. These are system components as those in FIG. 2.

In addition to these system components, the system further includes a destination registration processing section 252 for registering destinations containing a filter condition, a destination recording section 253 for creating a record of a destination containing a filter condition, a destination storage section 254 for storing destinations containing a filter condition, and a fault notification filtering section 251 for selecting the contents of fault information to be provided according to the filter condition for each destination.

FIG. 13 is an illustration showing an example of a destination registration table in which destinations containing a filter condition are registered in the destination registration processing section. As shown here, the destination registration table 50 consists of a number field 51, a protocol field 52, a destination address field 53, a port field 54, a busy flag field 55, and a filter condition field 56. To register one manager unit as a destination, data for the respective fields are registered as entry data.

The value of the number used as an index is stored in the number field 51. When a notification request is accepted, the number value is returned to the manager unit. To cancel the notification request, the manager unit specifies the number as an index. The protocol used to notify the manager unit of fault information is specified in the protocol field 52. The network address of the host system in which the manager unit operates is set in the destination address field 53. The port number used for the manager unit to receive a fault notification at the computer specified with the connection destination address is specified in the port field 54. A busy or idle flag is set in the busy flag field 55. If the busy flag is set, it indicates that the corresponding entry is the current notification target; if the idle flag is set, it indicates that the corresponding entry is not the notification target.

Data of the filter condition specified in a destination registration request from each manager unit as a destination is registered in the filter condition field 56. By setting the filter condition, the manager unit registered as the destination can selectively obtain its required fault information. Thus, when the manager unit registers destination of the manager unit into the service monitor unit, it sets a filter condition in the registration, whereby each service monitor unit uses the filter condition set by the manager unit to perform filtering and returns the resultant fault information to the manager unit.

When issuing a notification request to the service monitor units, the manager unit specifies fault information in which it takes an interest (filter condition). Each service monitor unit records the specified filter condition together with the destination. When receiving fault occurrence, for example, at the fault information acceptance processing section 215, the service monitor unit compares information on the fault occurring in the service program with the filter condition registered in the destination registration processing section 252 by the fault notification filtering section 251. If the fault information meets the filter condition, the service monitor unit notifies the manager unit as the destination of the fault information; otherwise, it does not notify the manager unit. This avoids waste of communication resources on network system administration. Since each manager unit need not receive unnecessary fault information, computer resources are also saved.

Figure 14:
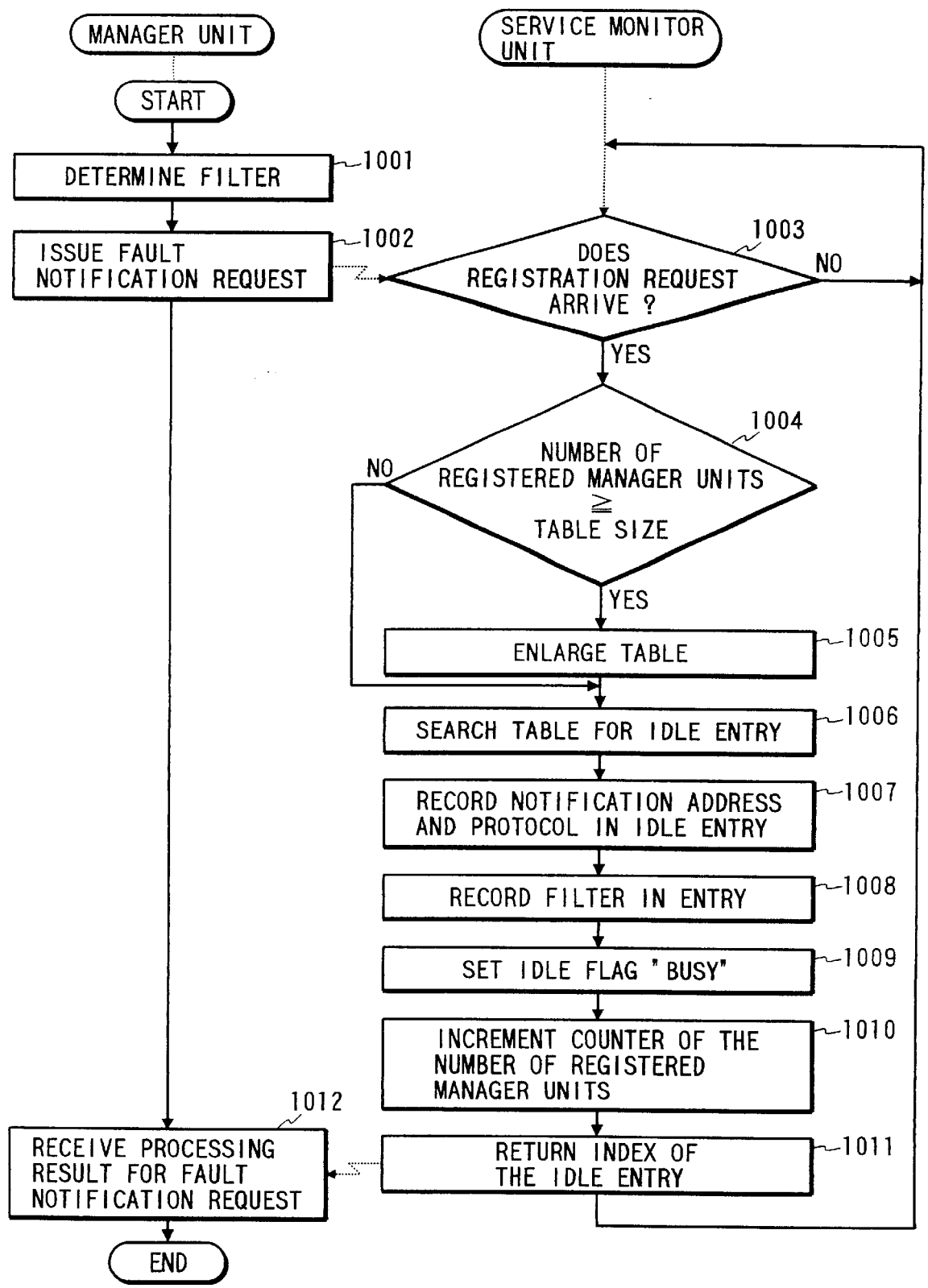
FIG. 14 is a flowchart explaining a destination setting process flow containing filter condition setting.

Next, characteristic processes in the network management system of the second embodiment thus configured will be discussed with reference to flowcharts. FIG. 14 is a flowchart explaining a destination setting process flow containing filter condition setting. FIG. 15 is a flowchart explaining a fault notification process flow containing filtering.

The destination setting process flow containing filter condition setting will be discussed with reference to FIG. 14. In this process, the service monitor unit accepts a fault notification request containing a filter condition from the manager unit making the request and registers the manager unit also containing the filter condition in one entry of the destination registration table as the destination. First, the manager unit determines a filter with the filter condition for selecting desired fault information at step 1001. Next, when the manager unit issues a fault notification request containing the filter information through the manager main unit at step 1002, the service monitor unit receives the fault notification request and determines whether or not a registration request arrives at step 1003. If it can be determined that a registration request arrives from the manager unit, then the service monitor unit checks for the current number of registered manager units (contents of a registered number counter) and table size at step 1004. If the table size is small, the service monitor unit enlarges the table at step 1005.

After checking that the table contains any entry in which the manager unit can be registered, the service monitor unit searches the table for an idle entry at step 1006 and records the destination address and protocol in the idle entry with respect to the manager unit making the fault notification request as the destination at step 1007. Further, it records the filter in the filter condition field of the entry at step 1008 and sets the idle flag to "busy" in the busy flag field at step 1009. Next, the service monitor unit increments the registered number counter at step 1010 and returns the index of the idle entry (number value in the number field) thus found at step 1011. The manager unit receives the processing result for the fault notification request at step 1012, checks that it is recorded as the destination in response to the registration request, and terminates the process.

When fault information detected by the service program is sent to each manager unit, a fault notification process containing filtering is executed. Next, a flow of the process will be discussed with reference to FIG. 15. When fault occurring is detected in the service program at step 1101, a fault notification is received from service at step 1102. The fault occurrence time is added to fault information at step 1103, further the fault source service name is added to the fault information at step 1104, and a system message of the fault information is set to 3 at step 1105. Next, fault ID is gotten from the fault information at step 1106. The fault ID is data indicating the fault type. The fault ID as a filter condition is set together with the manager units as the destinations for filtering.

Next, whether or not a manager as a destination is registered in the destination registration table is determined at step 1107. If it is registered, whether or not the table contains an unnotified manager as a destination is determined at step 1108. If the table contains an unnotified manager, the filter registered in the destination manager entry is gotten at step 1109 and whether or not the filter contains the fault ID is determined at step 1110. If the filter contains the fault ID, the fault information containing the fault ID is the fault information meeting the filter condition. Then, the fault information is sent to the destination in the entry (manager unit) at step 1111. To execute the notification process for the next destination, the table point is advanced at step 1112, and again steps 1108–1112 are executed to continue the process for the entry of another unnotified manager as a destination if present.

On the other hand, if the filter does not contain the fault ID contained in the fault information, the fault information does not meet the filter condition. Then, control goes to step 1112 at which the table point is advanced to execute the notification process for the next destination. Again, steps 1108–1112 are executed to continue the process for the entry of another unnotified manager as a destination if present. Upon completion of the process for all entries of unnotified managers as destinations, control returns to the fault detection step.

As described above, the network management system of the invention enables each manager unit to uniformly manage service information from the service units and can eliminate the information difference among the manager units. Even if the service program in the service unit goes down, automatically it is restarted and a fault notification is only issued. The manager units need not execute polling for detecting service starting. When it is restarted, automatic reconnection is also made in accordance with a notification request instruction from the manager units, so that the contents to be managed by the manager units do not become complicated.

Since the manager units need not always be operated for monitoring service, the computer resources of hardware of the network system can be used efficiently. The manager units are notified of necessary information when fault occurs simply by previously registering their destinations in the service monitor unit; likewise, the computer resources can be used efficiently.

What is claimed is:

1. A network management system, comprising:

a network communication channel;

a plurality of server units connected to said network communication channel; and a plurality of manager units for managing said plurality of server units and connected to said network communication channel, a state detected in each of said plurality of server units capable of being notified to said plurality of manager units so that said plurality of manager units monitor service of said plurality of server units;

wherein each of said plurality of server units comprises:

destination storage means for receiving from one of said plurality of manager units a fault notification request, said one of said plurality of manager units appends a network address of said one of said plurality of manager units to said fault notification request that said destination storage means stores as a stored destination;

notification means, when a fault occurs in service, for sending with said fault notification request fault information indicating contents of said fault only to said stored destination of said one of said plurality of manager units that issued said fault notification request; and means for controlling start and stop of service.

2. A network management system, comprising:

a network communication channel;

a plurality of server units connected to said network communication channel; and a plurality of manager units for managing said plurality of server units and connected to said network communication channel, a state detected in each of said plurality of server units capable of being notified to said plurality of manager units so that said plurality of manger units monitor service of said plurality of server units;

wherein each of said plurality of server units comprises:

destination storage means for receiving from one of said plurality of manager units a notification request, said one of said plurality of manager units appends a network address of said one of said plurality of manager units to said fault notification request that said designation storage means stores as a stored destination;

means for detecting a stop of a service providing program;

notification means, when said detection means detects said stop of said service providing program, for sending information with said notification request indicating contents of said detection only to said stored destination of said one of said plurality of manager units that issued said notification request; and means for controlling start and stop of service.

3. A network management system, comprising:

a network communication channel;

a plurality of server units connected to said network communication channel; and a plurality of manager units for managing said plurality of server units and connected to said network communication channel, a state detected in each of said plurality of server units capable of being notified to said plurality of manager units so that said plurality of manager units monitor service of said plurality of server units;

wherein each of said plurality of server units comprises:

destination storage means for receiving from one of a plurality of manager units a fault notification request having a filter condition, said one of said plurality of manager units appends a network address of said one of said plurality of manager units to said fault notification request that said destination storage means stores as a stored destination, said filter condition being specified by said one of said plurality of manager units that has issued said fault notification request;

filtering means for selecting fault information contents in accordance with said filter condition;

notification means, when a fault occurs in service, for sending fault information with said fault notification request indicating the contents selected by said filtering means only to said stored destination of said one of said plurality of manager units that issued said fault notification request; and means for controlling start and stop of service by instructions from said manager units.

4. A network management method wherein a manager unit manages a state of a server unit in a network system comprising a network communication channel, a plurality of server units connected to said network communication channel and a plurality of manager units for managing said plurality of server units and connected to said network communication channel, said method comprising the steps of:

sending a fault notification request from one of said plurality of manger units to one of said plurality of server units from which said one of said plurality of manager units wants to receive a fault notification, said fault notification request includes a network address of said one of said plurality of manager units that said one of said plurality of manager units appends to said fault notification request;

setting said network address of said one of said plurality of manager units as a stored destination in said one of said plurality server units receiving said fault notification request from said one of said plurality of manger units; and sending fault information only to said one of said plurality of manager units that issued said fault notification request set as said stored destination in said one of said plurality of server units when a fault occurs in said one of said plurality of server units.

5. A computer program product executable with a computer for managing a network, said computer program product controlling said computer to execute the steps of:

upon reception of a fault notification request from one of a plurality of management computers being connected to said computer on said network for managing said computer, setting a network address of said one of said plurality of management computers as a fault information destination, said network address being appended to said fault notification request by said one of said plurality of management computers that issued said fault notification request; and when a fault occurs in said computer, sending fault information only to said fault information destination.

6. The network management system of claim 1 wherein said destination storage means includes a nonvolatile storage means.

7. The network management system of claim 2 wherein said destination storage means includes a nonvolatile storage means.

8. The network management system of claim 3 wherein said destination storage means includes a nonvolatile storage means.

* * * * *